US010507567B2

(12) United States Patent
Hooks

(10) Patent No.: US 10,507,567 B2
(45) Date of Patent: Dec. 17, 2019

(54) HOPPER TRAILER OPENER

(71) Applicant: Arnco Solutions, Trenton, IL (US)

(72) Inventor: Jason Hooks, Highland, IL (US)

(73) Assignee: Arnco Solutions, Trenton, IL (US)

( * ) Notice: Subject to any disclaimer, the term of this patent is extended or adjusted under 35 U.S.C. 154(b) by 223 days.

(21) Appl. No.: 15/646,402

(22) Filed: Jul. 11, 2017

(65) Prior Publication Data

US 2018/0215019 A1 Aug. 2, 2018

Related U.S. Application Data

(60) Provisional application No. 62/452,019, filed on Jan. 30, 2017.

(51) Int. Cl.

| | |
|---|---|
| ***B25B 21/00*** | (2006.01) |
| ***B25B 23/00*** | (2006.01) |
| ***B60P 1/56*** | (2006.01) |

(52) U.S. Cl.

CPC ........ *B25B 21/002* (2013.01); *B25B 23/0021* (2013.01); *B25B 23/0078* (2013.01); *B60P 1/56* (2013.01)

(58) Field of Classification Search

CPC ....... B25B 21/00; B25B 21/002; B25B 21/02; B25B 19/00; B25B 23/0021; B25B 21/023; B25B 23/0028; B25B 23/0078; B60P 1/56

USPC ... 81/52, 54, 57.39, 57.24, 57.4, 121.1, 152, 81/177.2

See application file for complete search history.

(56) References Cited

U.S. PATENT DOCUMENTS

| | | | | |
|---|---|---|---|---|
| 2,896,955 A * | 7/1959 | Treppard | ................ | B23B 31/11 279/7 |
| 5,149,230 A * | 9/1992 | Nett | ........................ | B25B 21/00 408/125 |
| 6,055,887 A * | 5/2000 | Galat | .................... | B25B 21/002 81/177.2 |
| 6,250,399 B1 * | 6/2001 | Giardino | ................. | B25B 21/00 173/218 |
| 7,040,414 B1 * | 5/2006 | Kuo | ........................ | B25B 21/00 173/169 |
| 2004/0177978 A1 * | 9/2004 | Cobzaru | ............... | B25B 21/002 173/1 |
| 2009/0126960 A1 * | 5/2009 | Radif | ...................... | B25B 21/00 173/164 |
| 2012/0279362 A1 * | 11/2012 | Cummings | ............. | B25B 13/06 81/57.11 |
| 2013/0149027 A1 * | 6/2013 | Lin | ..................... | B25B 23/0021 403/306 |
| 2013/0333528 A1 * | 12/2013 | Su | ....................... | B25B 23/0007 81/177.2 |
| 2017/0001603 A1 * | 1/2017 | Chen | ................... | B25B 23/0078 |
| 2017/0036337 A1 * | 2/2017 | Sawano | ................ | B23B 45/008 |
| 2017/0136933 A1 * | 5/2017 | Bremer | ..................... | B60P 1/56 |

* cited by examiner

*Primary Examiner* — Joseph J Hail
*Assistant Examiner* — Timothy Brian Brady
(74) *Attorney, Agent, or Firm* — Behmke Innovation Group LLC; James Behmke; Stephen D. LeBarron

(57) ABSTRACT

According to one or more embodiments, a hand-held, portable opener for a hopper trailer and method of opening is described. The hopper trailer opener comprises a base tool assembly coupled with an extension shaft assembly and can be adapted for use with a variety of different trailer opening mechanisms.

20 Claims, 11 Drawing Sheets

DETAIL A

HOPPER TRAILER OPENER

CROSS-REFERENCE TO RELATED APPLICATION

This application claims the benefit of U.S. Provisional Application Ser. No. 62/452,019 filed Jan. 30, 2017, the disclosure of which is incorporated herein by reference.

TECHNICAL FIELD

The present disclosure relates generally to hopper trailer openers and, more particularly, to a hand-held portable pneumatically powered hopper door (gate) opener for trailer hoppers.

BACKGROUND

Hopper trailers, also sometimes referred to as grain trailers, are often used to carry a variety of goods, including, for example, grain, coal, gravel, ore, and the like. A hopper trailer typically includes one or more narrower openings on their undersides to facilitate unloading of the cargo loaded within. In particular, the one or more narrower openings may be closed, to retain the cargo during transport, and opened at the destination, to allow the cargo to be unloaded.

Opening and closing trailer hopper gates is often challenging due to the positioning of the gate beneath the trailer and the sometimes high torque input needed to turn the hopper's opening mechanism by hand crank. Some hopper gates require more torque input to open because of corrosion and/or the weight and type of cargo loaded in the hopper. The combination of the low gate position, and the considerable torque input sometimes needed to open hoppers creates safety issues for workers opening hoppers using a manual crank, especially under repetition. The hopper opener must be portable enough to be positioned beside the trailer and have enough torque to open the trailer hopper gate without damaging the opening mechanism or gate itself. In addition, not all hopper gates are configured in the same way, and different hopper gate opening mechanism configurations typically require different opener tool configurations.

SUMMARY

According to one or more embodiments of the present disclosure, a hopper trailer opener comprises an extension shaft assembly removably coupled with a base tool assembly. The base tool assembly comprises a motor contained within a motor housing and a rotatable drive configured to be rotated by the motor, the rotatable drive having a drive head and a spindle attached to the rotatable drive and protruding from the drive head. The extension shaft assembly comprises a drive shaft having an end comprising a base tool assembly connector configured to be removably coupled to the rotatable drive of the base tool assembly and an opposing end having a trailer coupler configured to couple to an opening mechanism of a hopper trailer.

DESCRIPTION OF THE DRAWINGS

The foregoing and other objects, features, aspects and advantages of the embodiments disclosed herein will become more apparent from the following detailed description when taken in conjunction with the following accompanying drawings.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DESCRIPTION OF EXAMPLE EMBODIMENTS

The techniques described herein provide for a hopper trailer opener that facilitates the positioning of an opener device onto a hopper trailer opening mechanism and operating of the opener device to facilitate gate opening for dispensing of the hopper cargo. In some aspects, the opener is lightweight enough to be hand-held and portable and may include a quick-connect attachment system to allow an operator to easily open hopper trailers having different opening mechanism configurations. In further aspects, the hopper trailer opener is pneumatically operated to provide sufficient torque and speed to open the hopper gate without damage to either the gate opening mechanism or to components of the opener device and without injury to the person operating the opener device.

In general, a hopper trailer/grain trailer may generally be wider at its top than at its bottom and define an internal storage space in which cargo, such as grain, gravel, or other flowable particulate material, may be stored during transport. The top of the hopper trailer may include an opening into the internal storage space, thereby allowing cargo to be top loaded into the trailer. In some cases, a covering may then be placed onto the top of the hopper trailer in order to protect and retain the stored cargo. In other cases, certain cargo may remain exposed during transport, such as when hitched to a moving truck.

Figure 1A:
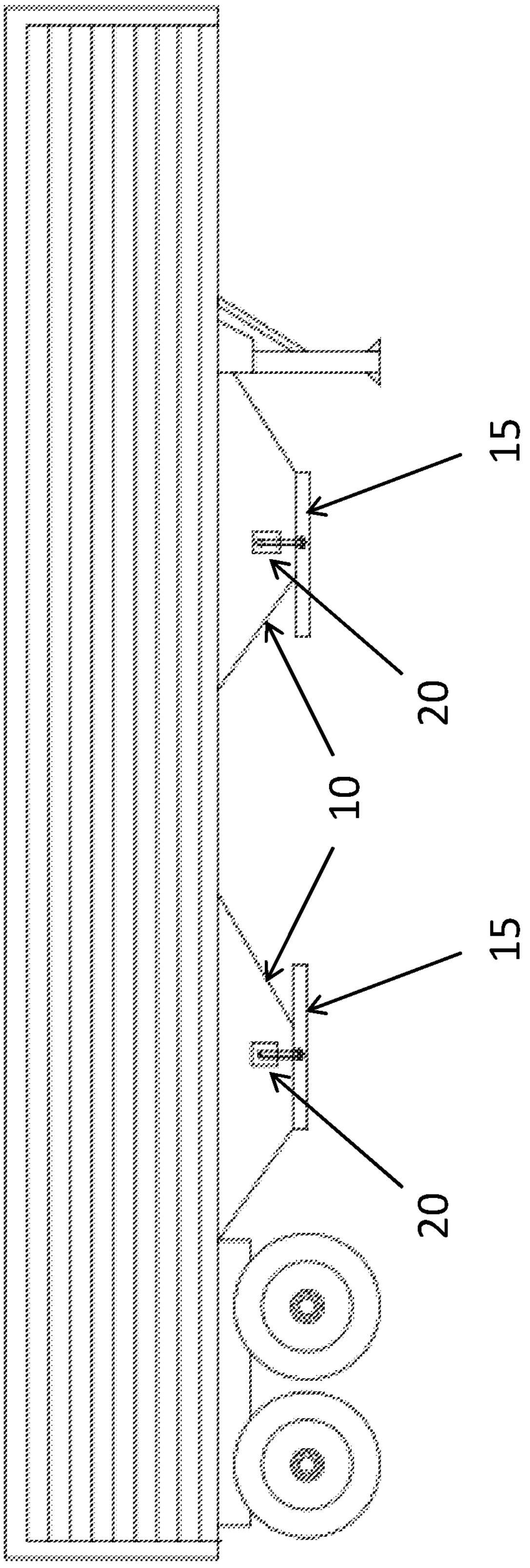
FIG. 1A is a view of a hopper trailer and FIGS. 1B-1E are views of a hopper trailer opener, according to embodiments of the present disclosure.

A typical hopper trailer is shown in FIG. 1A. As shown, the bottom of the hopper trailer may include one or more unloading sections, 10. Any particular unloading section may include a hollow passageway connected to the storage space of hopper trailer along with a closure/gate 15 and an opening mechanism 20. When the gate is in a closed position, the passageway of an unloading section is sealed to retain the cargo within hopper trailer, such as during transport. When the gate is in an open position, such as by operation of the opening mechanism, the cargo is allowed to pass through the opened unloading section due to the effects of gravity on the cargo.

A variety of different opening mechanisms are available. For example, the opening mechanism may comprise a rotatable coupler (such as a crank or shaft) that, when turned, operates to gradually open the gate, such as by sliding or separating gate sections, allowing the cargo to pass through the formed opening. The rotatable coupler may further include an attachment end configured to receive a hopper trailer opener and enable the coupler to be rotated. The configuration (size, shape, location, etc.) of the coupler and attachment end may differ depending, for example, on the type of trailer and opening mechanism. For example, the rotatable coupler may be a shaft having a hex head attachment end configured to receive a correspondingly matched socket.

The hopper trailer opener of the present disclosure comprises a base tool assembly removably coupled to an extension shaft assembly. The base tool assembly comprises a motor contained within a motor housing. The motor may be of any number of different types and is configured to provide the required torque and speed needed to smoothly open the gate of a hopper trailer without damage to either the gate or the hopper trailer opener. In particular, the final usable output torque of the opener device may be between about 40 and 250 ft-lb, and the maximum usable speed of the opener device may be between about 20 and 140 rpm. Gearing may be used to change the output of the motor if needed to be suitable for the specific hopper trailer opening application to, for example, increase the torque while decreasing the speed or decreasing the torque and increasing the speed.

A source of power may also be provided to the base tool assembly, such as air, electric, hydraulic, or battery power. For example, the motor may be a non-impact pneumatic motor operated by a pressurized source of air supplied by attachment to a suitable coupler or fitting positioned at an end of the base tool assembly. Air flow restrictors may also be included if motor speed reduction is desired, such as if the available source of air pressure has a higher flow rate than required to smoothly open the gate without damage. Similarly, air pressure regulators may be included if motor torque reduction is desired, such as if the available source of air pressure has a higher pressure than required to smoothly open the gate without damage. Furthermore, the base tool assembly may also comprise a trigger/throttle lever configured to adjust the speed of the motor and/or a forward/reverse control, such as a rotatable ring positioned near the trigger/throttle lever, thereby giving the operator more control on the opening and closing process and providing smooth continuous torque to the opening mechanism of the hopper trailer. Preferably, the base tool assembly is light weight (such as less than 14 pounds) and low noise (such as less than 90 decibels).

The base tool assembly further comprises a rotatable drive configured to be turned by the motor. In some embodiments of the present disclosure, the rotatable drive may extend linearly from the motor, enabling an operator to apply direct pressure from the back of the motor housing containing the motor through the rotatable drive onto the hopper trailer opening mechanism. In other embodiments, the base tool assembly comprises an angled drive head, such as a 90 degree angled head, and the angle of the angled drive head may be adjustable in order to provide various approach angles to securely attach to the hopper trailer opening mechanism. The rotatable drive may further include gearing or other appropriate direction changing means. In this way, an operator may counter the torque outputted by the opener and, in some cases, may exert direct force towards the opening mechanism of the trailer hopper while operating the motor of the hopper trailer opener for additional opening torque.

The base tool assembly may further comprise a handle positioned at one end of the base tool assembly and may also include a hand grip positioned at an opposite end, such as adjacent to the throttle lever, to provide better control over the hand-held opening device. In some embodiments, the base tool assembly further includes a torque reaction bracket positioned to enable the transfer of torque reaction forces to the hopper trailer as the opener is operated. For example, the base tool assembly may include a fixedly attached bracket positioned to contact a portion of the hopper trailer (such as the unloading section or the underside of the hopper trailer) in order to brace the opener as the rotatable drive is rotated to open the hopper trailer opening mechanism. In this way, the opener can be leveraged against the hopper trailer as it turns the opening mechanism, transferring reaction torque forces to the trailer and providing additional stability for the hopper trailer opener and operator.

The rotatable drive of the base tool assembly may further include a driven spindle protruding from the drive head (such as perpendicular to the surface of the drive head) to which the extension shaft assembly may be removably attached. In some embodiments, the spindle comprises a square drive with a threaded stud and is configured to mate with an end of the extension shaft assembly, described in more detail below. Furthermore, the rotatable drive may further comprise at least one attachment stabilizer to ensure the extension shaft assembly is secured, thereby preventing wobble, damage, and accidental detachment. For example, the rotatable drive may comprise a thrust bearing centrally positioned at the base of the spindle.

As noted above, the hopper trailer opener of the present disclosure further comprises an extension shaft assembly removably attached to the base tool assembly. In some embodiments, the extension shaft assembly comprises a drive shaft, such as an extension tube, having one end comprising a base tool assembly connector configured to be removably coupled to the rotatable drive of the base tool assembly and an opposing end comprising a trailer coupler configured to couple with the opening mechanism of the hopper trailer. The drive shaft may vary in length depending, for example, on the type of hopper trailer opener and its position on the hopper trailer relative to the user. For example, in a specific embodiment, the base tool assembly connector may comprise a drive hub sized and shaped to mate with the thrust bearing of the rotatable drive of the base tool assembly. The drive hub may be separate from or contiguous with the drive shaft and may fit securely over the spindle and thrust bearing of the base tool assembly. In addition, or alternatively, the trailer coupler of the drive shaft of the extension shaft assembly may include a variety of different connector types to couple with the different hopper trailer opening mechanisms. In some embodiments, a removable coupler may be advantageous. For example, the trailer coupler may comprise a socket assembly sized and shaped for a rotatable coupler (having, for example, a hex head attachment end) of a hopper trailer opening mechanism. The socket assembly may be separable from the drive shaft and may, in some cases, utilize a quick-connect mechanism. In this way, sockets of different sizes and shapes may be used with the same drive shaft, with the quick-connect mechanism enabling a secure connection and a quick changeover.

In some embodiments, the socket assembly may include one or more extenders sized and shaped to prevent the socket assembly from falling through a facility's grating, which is generally positioned beneath the gate of the hopper trailer to collect and transport the trailer cargo. Any sizeable object falling through the grating could cause serious damage to the moving parts below (such as augers, etc.). The socket extender may be, for example, an extension arm or a ring or disk positioned around the socket assembly, such as at the base of the socket assembly.

Opening mechanisms on some hopper trailers include a latch, such as a ratchet and pawl in which the pawl engages the teeth of the ratchet, to prevent the hopper gate from being opened or closed accidentally. Under some conditions, the latch may be difficult to release. For example, the pawl may become stuck within the ratchet teeth, and releasing the pawl to open the gate can become very difficult. In some embodiments, the hopper trailer opener of the present disclosure may further include at least one locking mechanism to temporarily prevent the extension shaft assembly from turning. In this way, the opener may be used to manually release the latch or pawl, such as by applying a reverse turning force on the opening mechanism. For example, the hopper trailer opener may comprise at least one brace fixedly attached to the base tool assembly and a corresponding lock fixedly attached to the extension shaft assembly. Engaging the lock and the brace would temporarily prevent the extension shaft assembly from turning, allowing the hopper trailer opener to be used to manually turn the gate opening mechanism to release the stuck latch or pawl. Disengaging of the lock and brace would permit the opener to be operated under power, such as pneumatically.

Specific embodiments and components of the hopper trailer opener of the present disclosure are shown in FIGS. 1-4 and discussed in more detail below. However, it should be apparent to those skilled in the art that these are merely illustrative in nature and not limiting, being presented by way of example only. Numerous modifications and other embodiments are within the scope of ordinary skill in the art and are contemplated as falling within the scope of the present disclosure. In addition, those skilled in the art should appreciate that the specific configurations are exemplary and that actual configurations will depend on the specific system. Those skilled in the art will also be able to recognize and identify equivalents to the specific elements shown, using no more than routine experimentation.

Figure 1B:
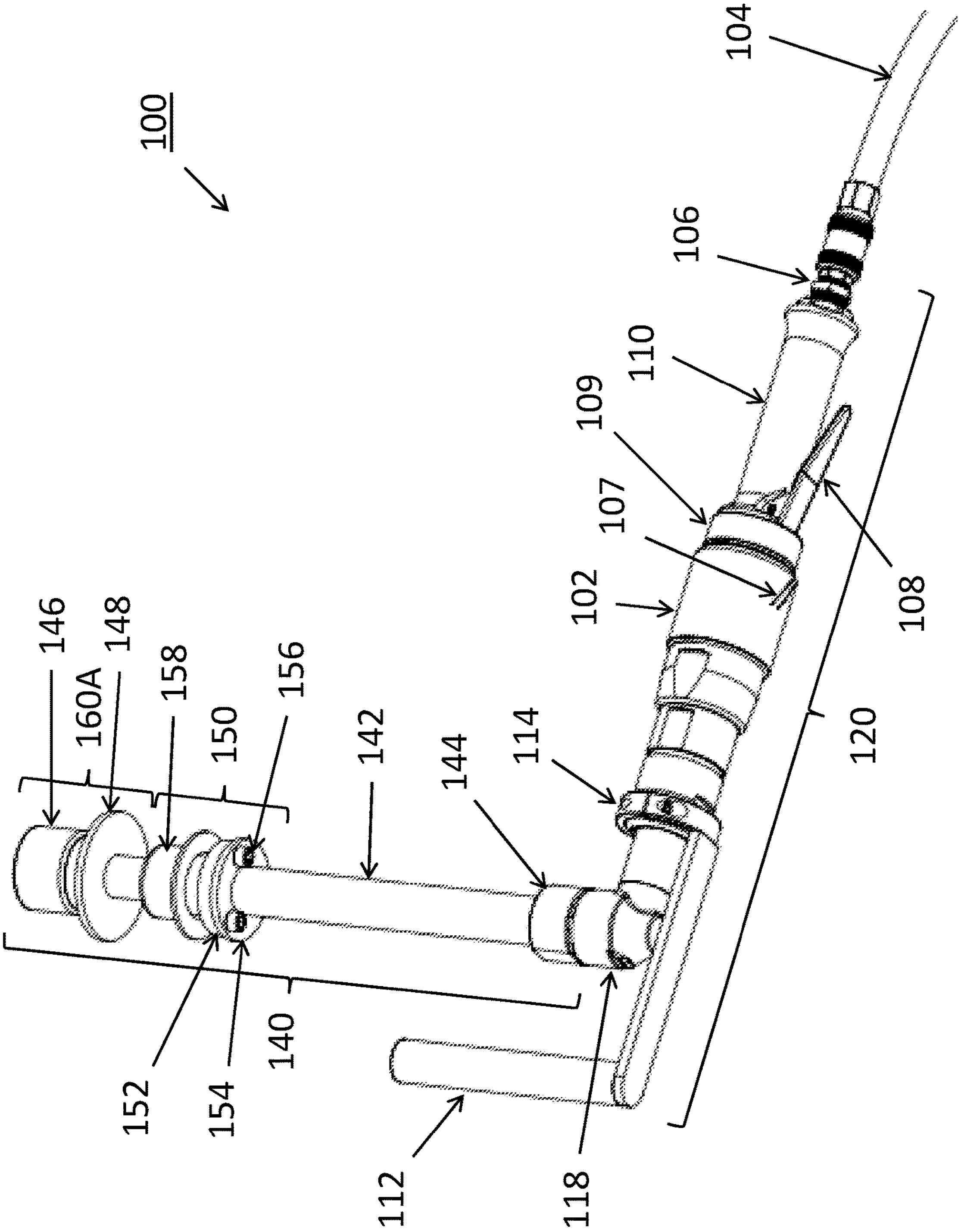
Figure 1C:
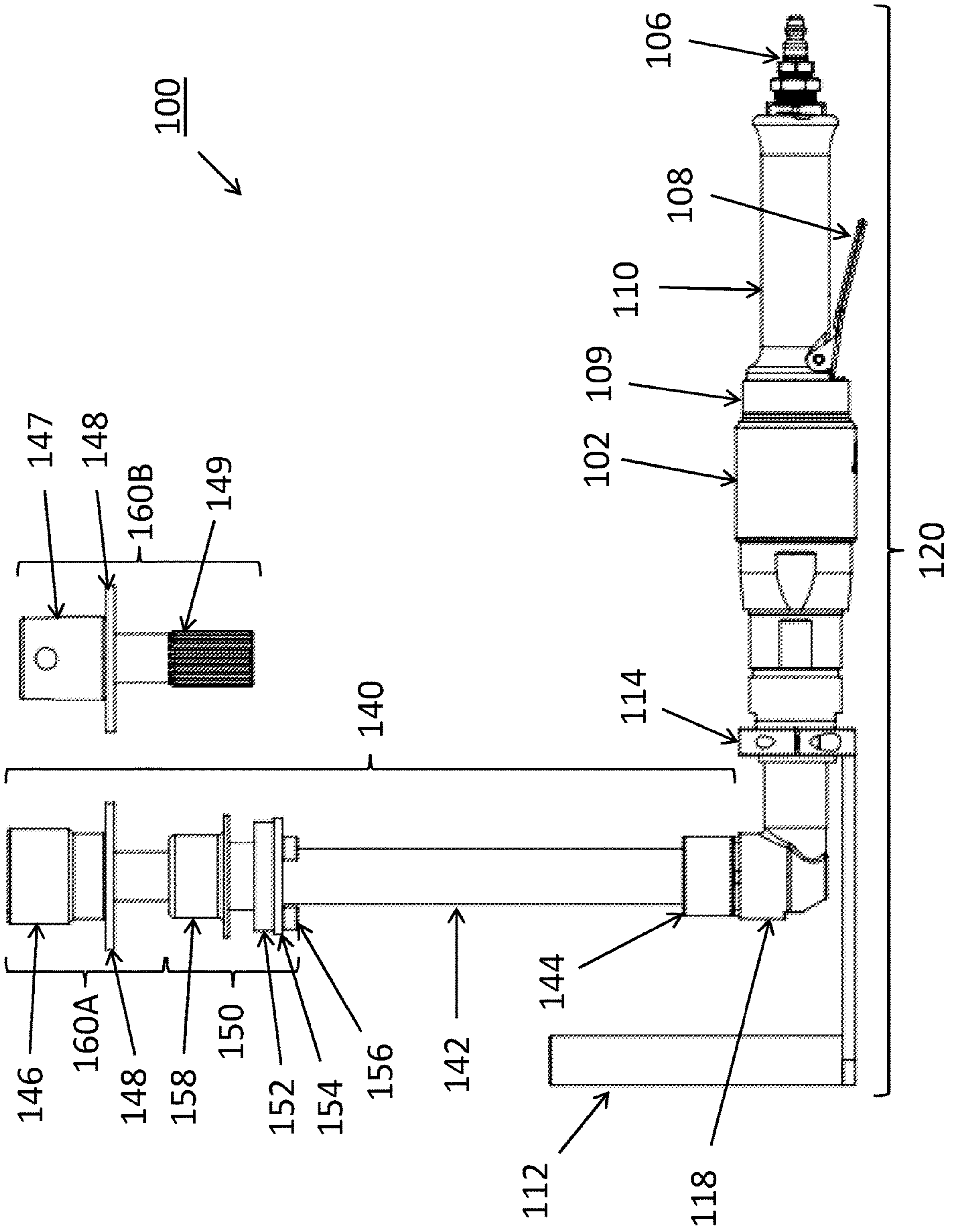

FIGS. 1B-1E show various views of an example hopper trailer opener 100 of the present disclosure. As shown in FIGS. 1B-1C, hopper trailer opener 100 includes base tool assembly 120 removably attached to extension shaft assembly 140. Base tool assembly 120 comprises a motor contained within housing 102 operable pneumatically by pressurized air supplied through supply line 104 connected to the base tool assembly by air inlet fitting 106. The housing may further include air exhaust outlet 107, which, as shown particularly in FIG. 1B, may be centrally positioned along the housing or, in other embodiments, may be provided at the end of the base tool, such as near air inlet fitting 106, depending, for example, on the motor design. In addition, throttle lever 108 may provide additional control over motor speed, and forward/reverse control ring 109 can be used to change the drive direction. While lever 108, as shown in FIG. 1B and in FIG. 1C, is positioned on the operator side of the apparatus, the lever may be provided anywhere along the base tool assembly, such as on the side opposite to the user in order to provide finger-based operation of the lever. In addition, the lever may be capable of being repositioned during use. Base tool assembly 120 further comprises hand grip 110 adjacent to throttle lever 108 along with handle accessory 112 which, together, may provide better control over the positioning and action of the apparatus. As shown, the handle and the grip may preferably be positioned apart from each other, near opposing ends of the base tool assembly. In addition, handle accessory 112 may be adjustable in length and, further, in position, such as by rotating and locking attachment collar 114.

Base tool assembly 120 further comprises a rotatable drive included within angled drive head 118. As shown, the angle of the drive head is 90 degrees, and, in this way, control and pressure can be provided by the operator, positioned opposite the direction of the drive head, toward the target hopper trailer opening mechanism. However, other angles may also be desirable, depending, for example, on the angle of the hopper trailer opening mechanism. Also, the angle of the drive head may be adjustable, providing additional flexibility and fit for a wider variety of opening mechanism configurations. The transmission of rotating power through the angle of the drive head may be achieved by gearing or any other known direction changing means.

Hopper trailer opener 100 further comprises extension shaft assembly 140. As shown in FIGS. 1B-1C, this assembly includes drive shaft tubing 142 removably attachable to the base tool assembly by a base tool assembly connector at one end and to the hopper trailer opening mechanism by a trailer coupler on the opposite end. In particular, drive shaft tubing 142 may comprise drive hub 144, removably attached to drive head 118, as well as socket assembly 160A that includes, for example, socket 146, sized and shaped for the specific type of trailer opening mechanism. The drive shaft tubing may be longer or shorter as needed in order to provide proper operator positioning relative to the hopper trailer opener. The base tool assembly connector, specifically drive hub 144, is described in more detail below.

As is also shown, the socket assembly is preferably connected to the drive shaft tubing using quick-connect assembly 150. In this way, socket assemblies of different sizes may be interchanged readily during use, without removing the extension shaft assembly from the base tool assembly. Any style quick-connect may be used. For example, as shown, quick-connect assembly 150 may comprise socket receiver 152 supported on extension/drive shaft tubing 142 by adapter flange plate 154 using fasteners, such as bolts 156. Socket receiver pull rim 158 may be positioned over socket receiver 152, and socket assembly 160A or 160B may be inserted into socket receiver 152, such as by splined shaft 149. By squeezing the socket receiver pull rim towards the socket receiver, the socket assembly may be released, allowing removal and replacement with an alternative size/style socket assembly, such as socket assembly 160B that includes socket 147. Socket assemblies, particularly those having a smaller overall diameter, such as socket assembly 160A or 160B, may also include one or more socket extenders, such as socket disk 148, to increase the overall diameter of the socket assembly and prevent the socket assembly from falling through grating, such as grating covering moving machinery. The socket disk may be permanently attached to the socket assembly, such as to the splined shaft, to lock in place with the quick connect assembly.

Figure 1D:
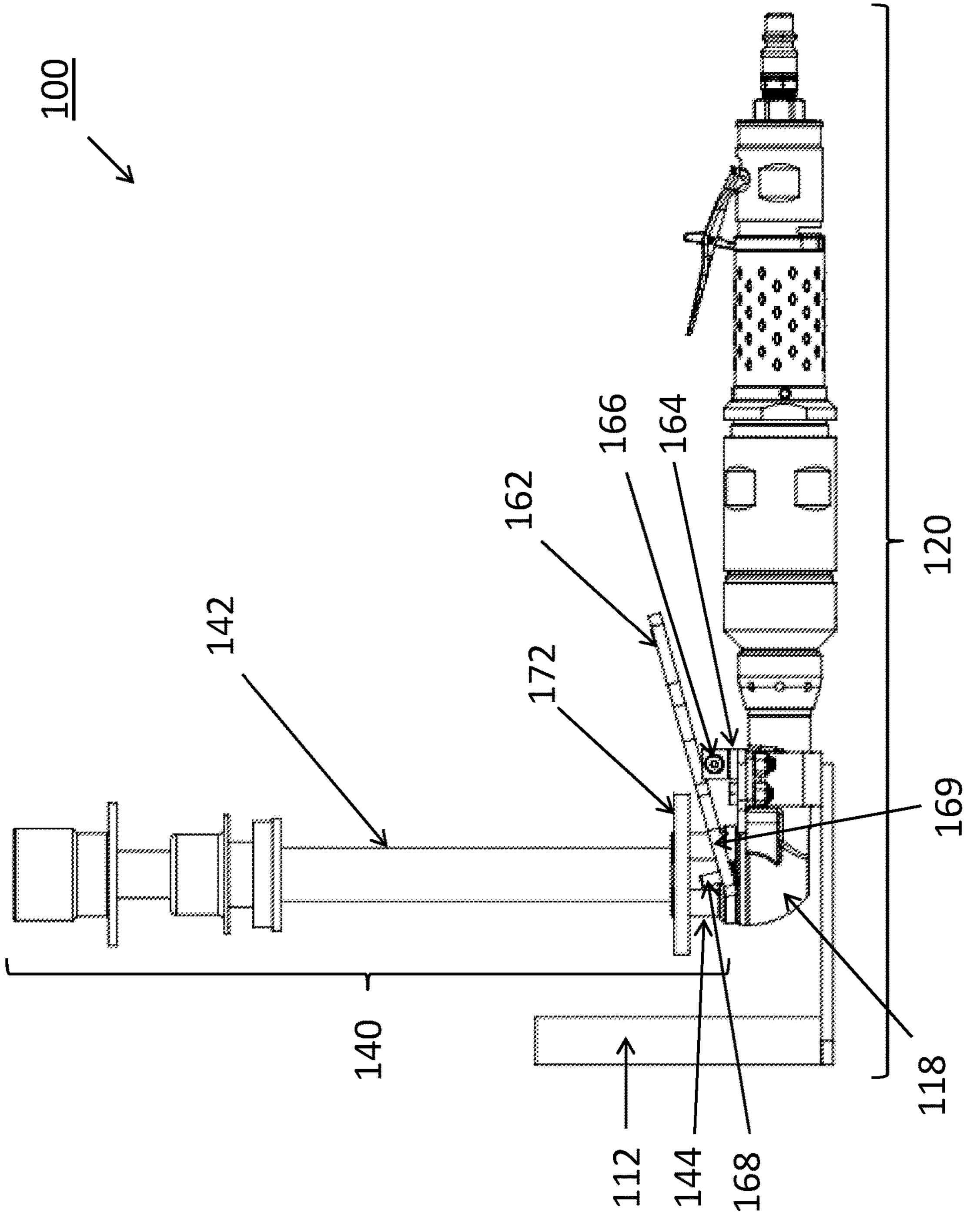
Figure 1E:
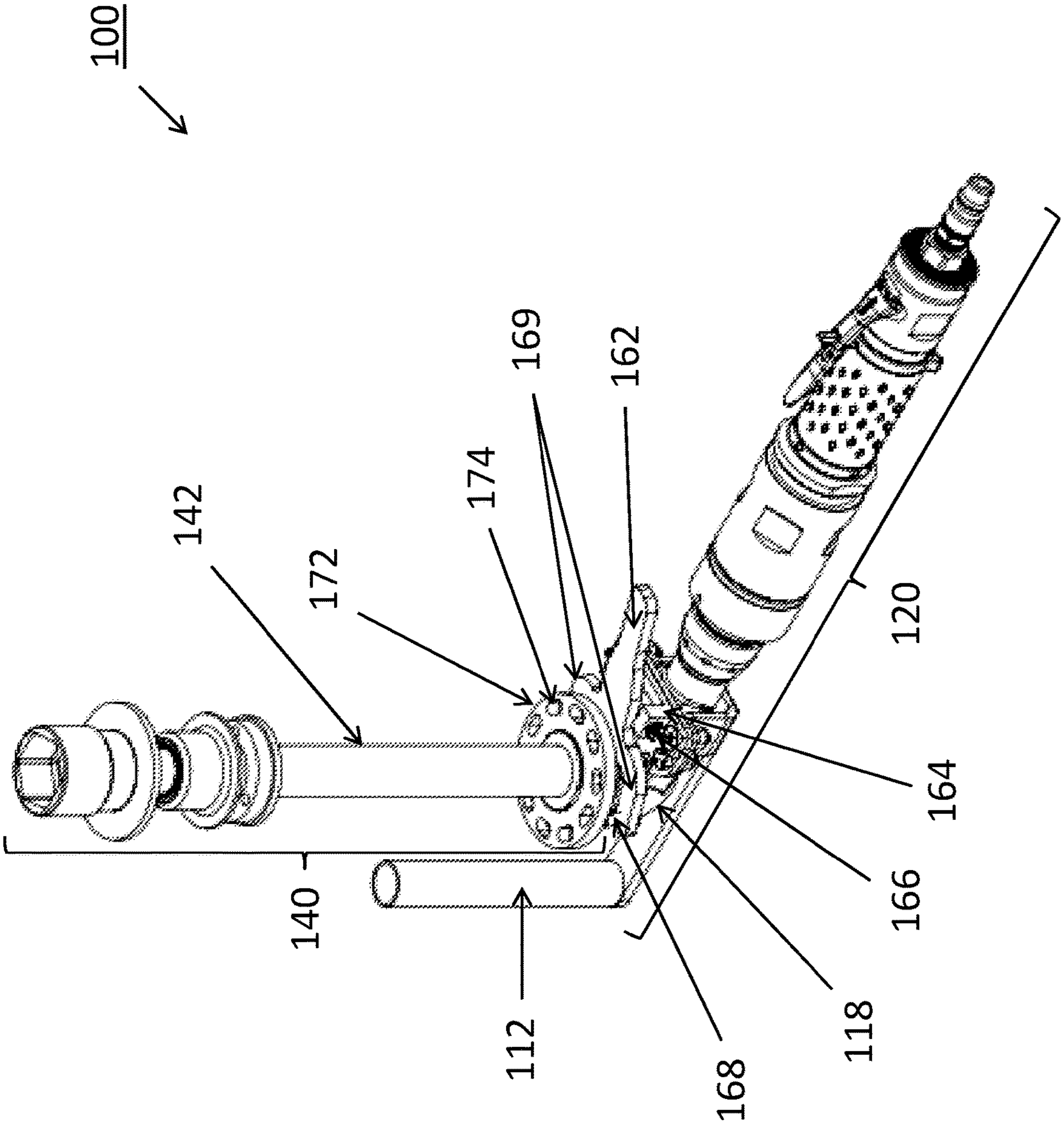

As shown in FIGS. 1D-1E, hopper trailer opener 100 may further comprise a locking mechanism having a lock and a brace in order to at least temporarily prevent the extension shaft assembly from turning. In particular, base tool assembly 120 comprises shaft lock lever 162 attached to lever pivot mount 164 by lever pivot 166. Shaft lock lever 162 includes one or more shaft lock pins 168 positioned along arms 169 of the shaft lever 162 such that the pins may be moved into a locking position when the lever is pivoted on lever pivot 166. As shown in this specific embodiment, the lever is attached to handle accessory 112 thereby bracing the locking mechanism against the base tool assembly. However, the lever may instead be attached at other positions along the base tool assembly, including at the end of the angled drive head 118. The lever may be fixedly attached or, in some embodiments, may be removably attached, as long as the lever is braced in position during use, such as to open a stuck pawl of a hopper trailer opening mechanism.

As is also shown in the specific embodiment of FIGS. 1D-1E, extension shaft assembly 140 comprises grab ring 172, which includes one or more holes 174 sized and shaped to accept shaft lock pins 168. This is more clearly shown in the view in FIG. 1E in which multiple holes are provided in grab ring 172 in order to more readily engage shaft lock pins 168 on both arms 169 of shaft lock lever 162 positioned on opposing sides of the extension shaft assembly. The grab ring may be attached, fixedly or removably, at a variety of positions along the extension shaft assembly, although a fixed attachment positioned closer to the base tool assembly may provide improved leverage and reliability of the mechanism. Thus, as shown in this specific embodiment, grab ring 172 is fixedly attached to drive hub 144 and therefore to drive shaft tubing 142, such as by soldering, brazing, welding, or like processes. In this way, shaft lock lever 162 attached to base tool assembly 120 may be pivoted to engage shaft lock pins 168 in holes 174 of grab ring 172 fixedly attached to extension shaft assembly 140, thereby temporarily preventing the extension shaft assembly from turning and allowing hopper trailer opener 100 to be used to manually turn an opening mechanism of the hopper trailer.

Figure 2A:
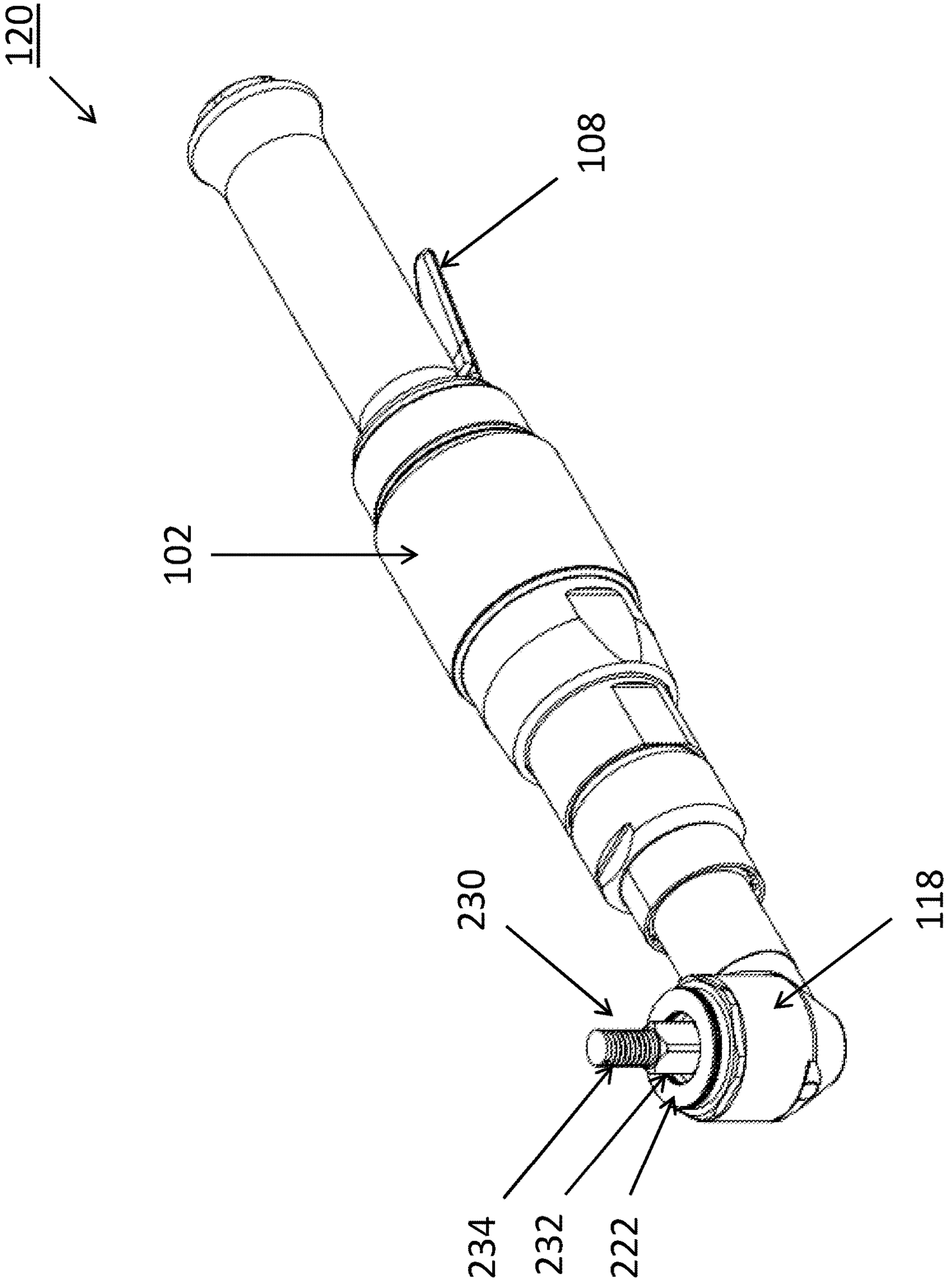
FIGS. 2A-2C are views of a base tool assembly of a hopper trailer opener according to embodiments of the present disclosure.
Figure 2B:
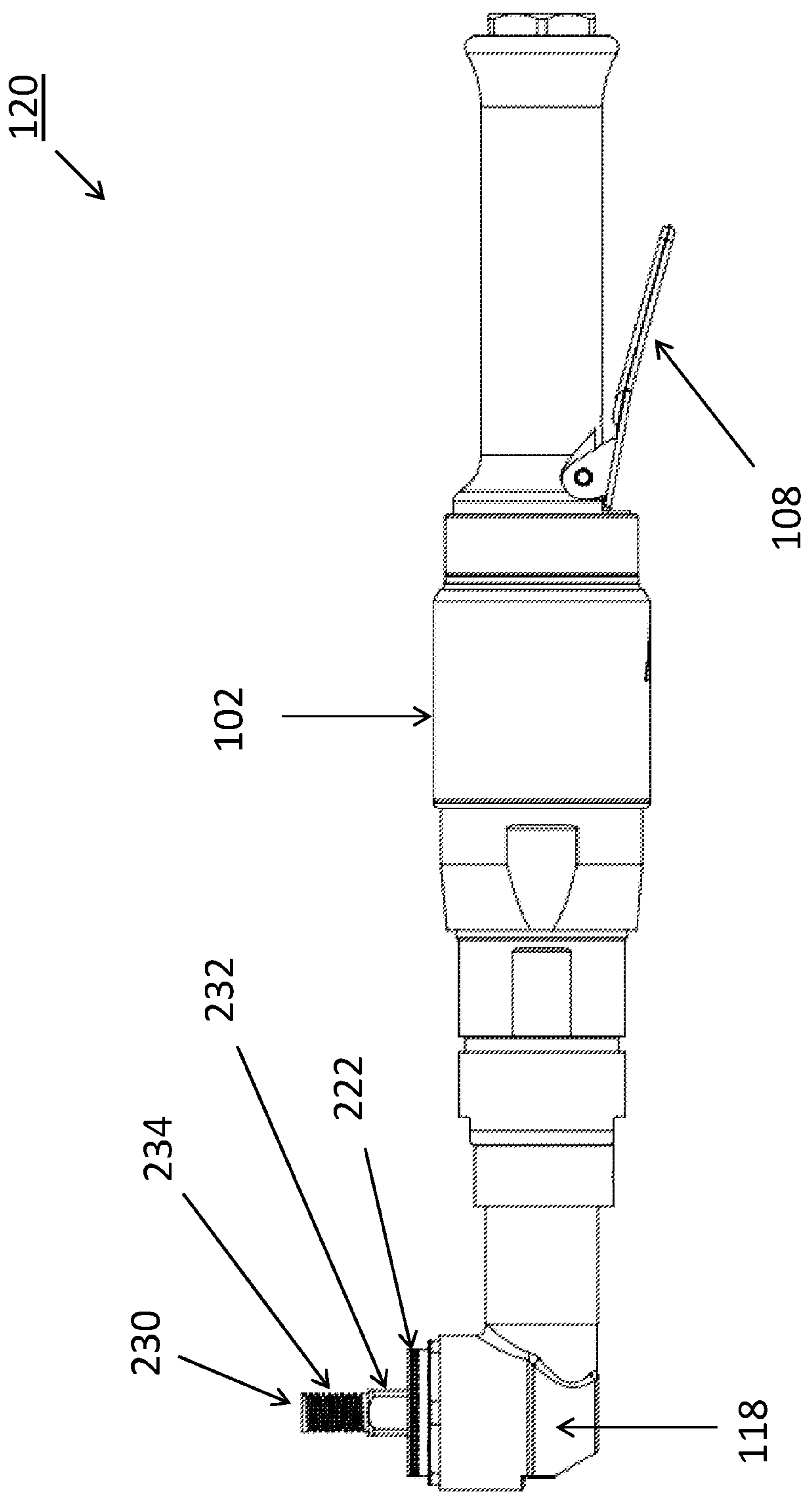
Figure 2C:
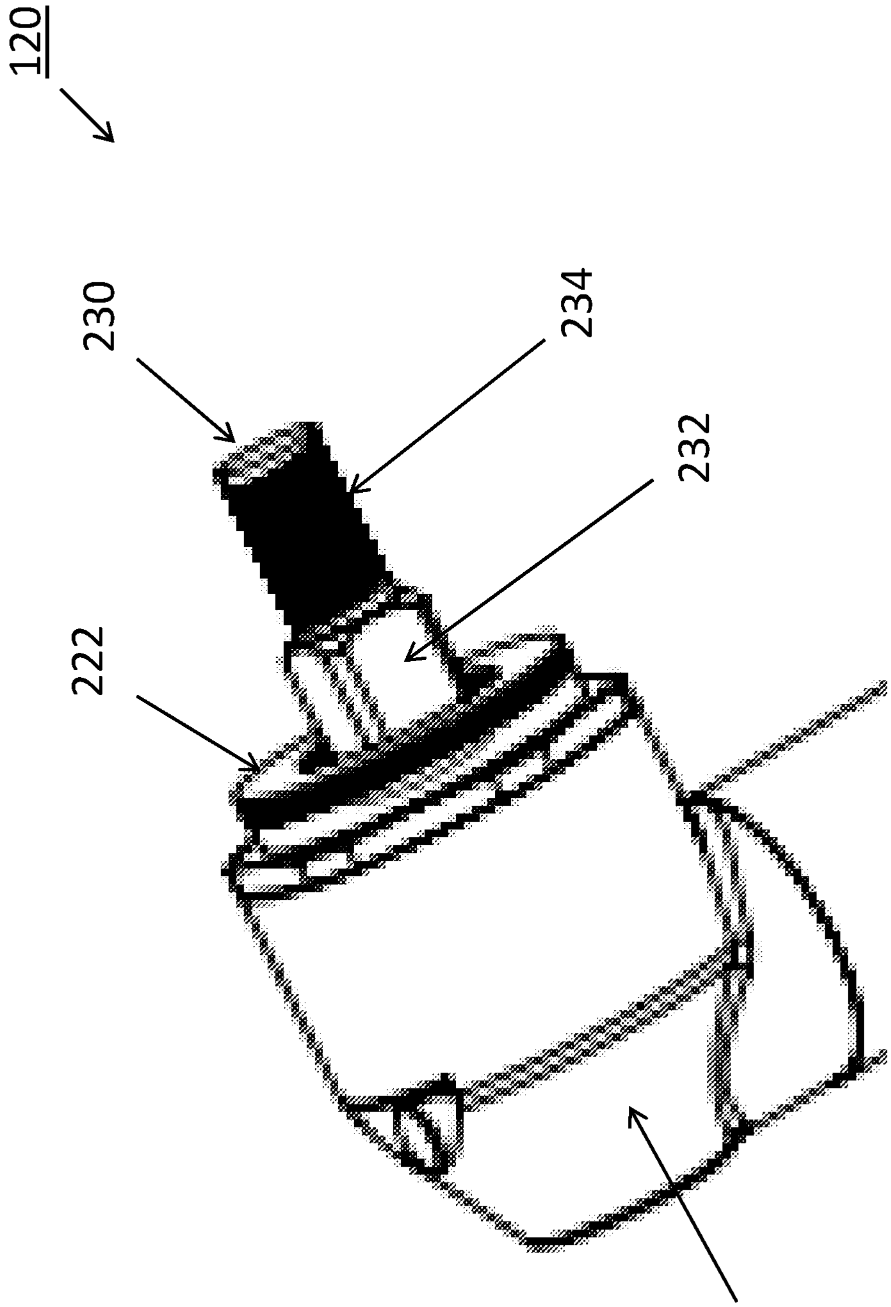

FIGS. 2A-2C show various views of base tool assembly 120 from which the extension shaft assembly has been detached, according to various embodiments of the present disclosure. As shown, base tool assembly 120 comprises housing 102 containing a rotatable drive and motor, throttle lever 108, and angled drive head 118. The base tool assembly further comprises thrust bearing 222 centrally positioned on the drive head with spindle 230 of the rotatable drive protruding through and centrally positioned on angled drive head 118 with the thrust bearing. As shown, spindle 230 comprises square drive 232 with threaded stud 234, both configured to mate with an end of the extension shaft assembly when attached. The rounded corners and edges of the square drive may be preferable to enable the extension shaft assembly to seat more easily and be more readily secured to the drive head of the rotatable drive.

Figures 3A, 3B:
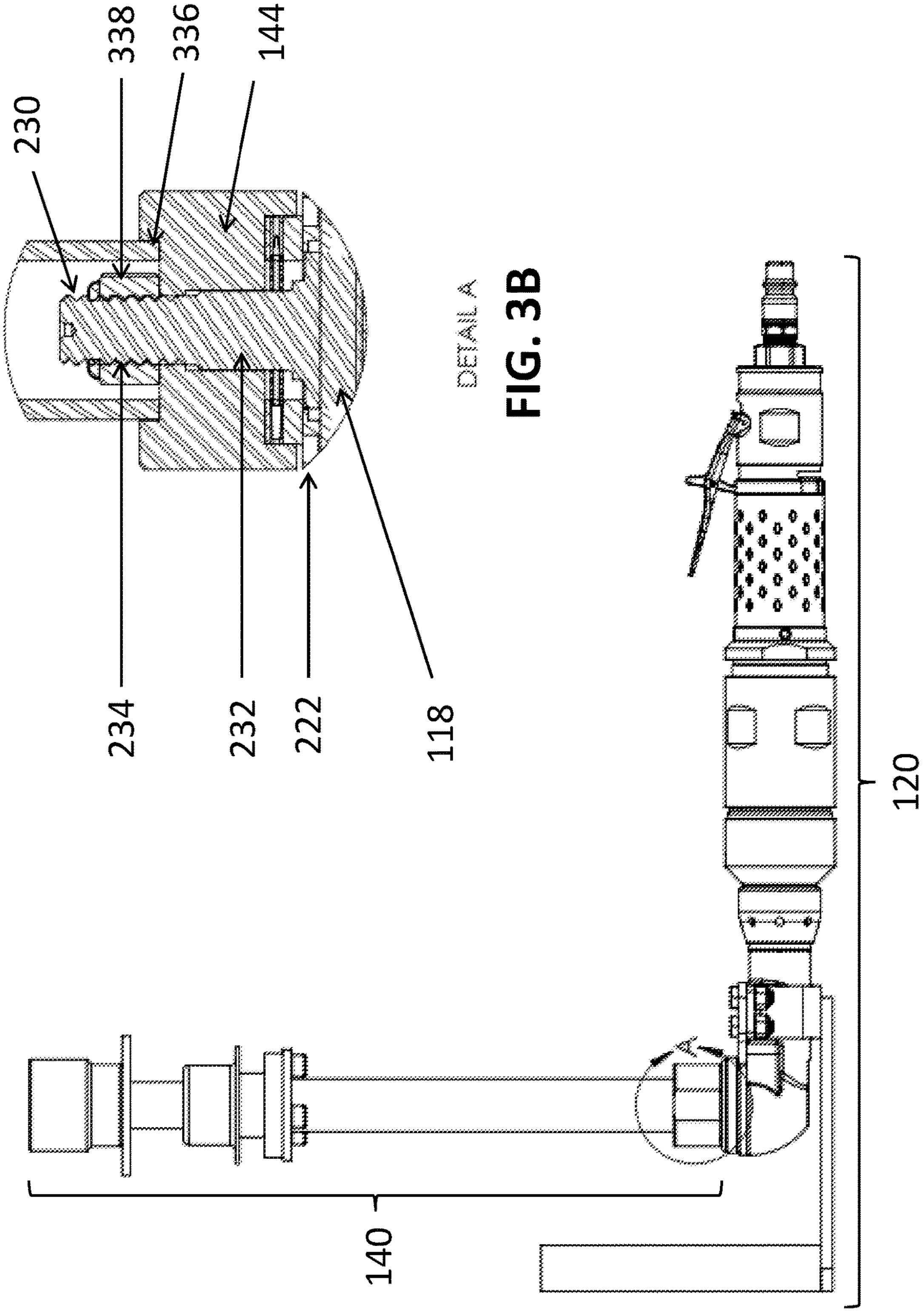
FIGS. 3A-3B and FIG. 4 are views of an extension shaft assembly of a hopper trailer opener according to embodiments of the present disclosure.
Figure 4:
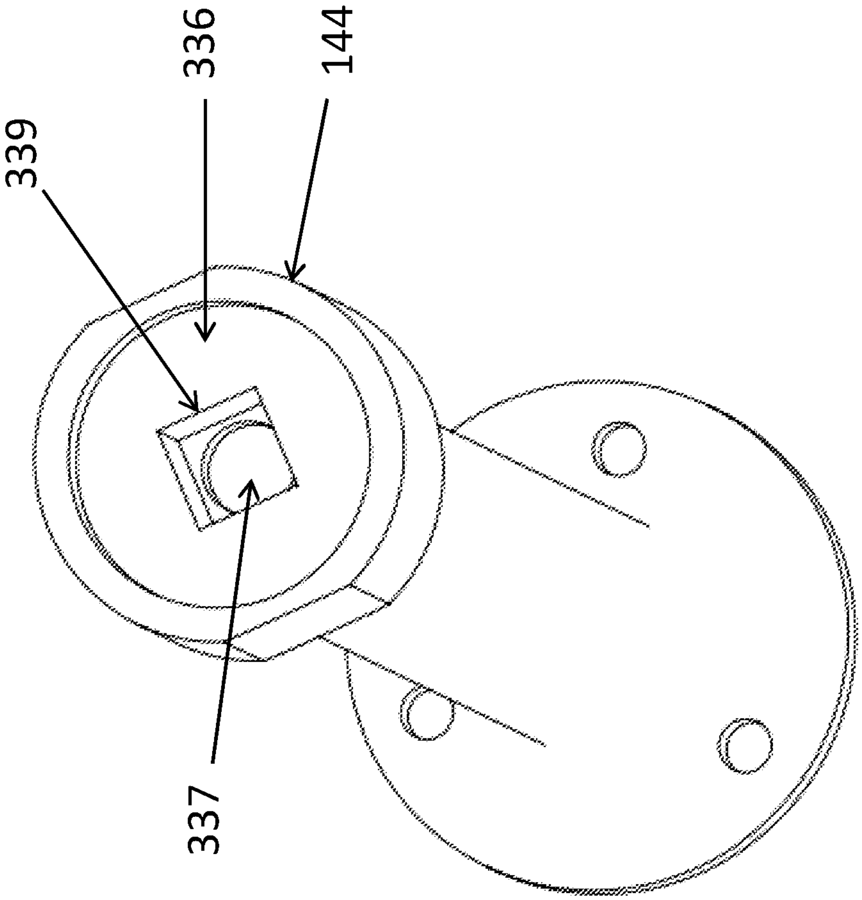

The attachment of the extension shaft assembly and the base tool assembly is shown in more detail in FIGS. 3A-3B. As shown, angled drive head 118 of base tool assembly 120 comprises thrust bearing 222, and spindle 230, which includes square drive 232 and threaded stud 234, extends from the angled drive head through the thrust bearing. Extension/drive shaft tubing 142 of extension shaft assembly 140 includes drive hub 144, which, in this embodiment, is fixedly attached to the end of the tubing, such as by soldering, brazing, welding, or like processes. The drive hub further includes recessed face 336 having opening 337 and recess 339 sized and shaped for spindle 230. This is more clearly shown in FIG. 4. To attach the extension shaft assembly to the base tool assembly, in this embodiment, extension/drive shaft tubing 142 with drive hub 144 may be positioned onto thrust bearing 222, with threaded stud 234 of spindle 230 protruding into the tubing through opening 337 and square drive 232 of spindle 230 resting within recess 339, thereby rotatably coupling the spindle of the rotatable drive to the extension shaft assembly. Lock nut 338 may be inserted into the tubing and tightened onto the threaded stud, such as with an extension socket. As the lock nut is tightened and contacts recessed face 336, drive hub 144 can be tightened firmly onto thrust bearing 222. In this way, the extension/drive shaft tubing is fastened and stabilized onto the drive head of the base tool assembly, avoiding detachment during use, and significantly reducing wobble and lowering stresses in the spindle.

Figure 5:
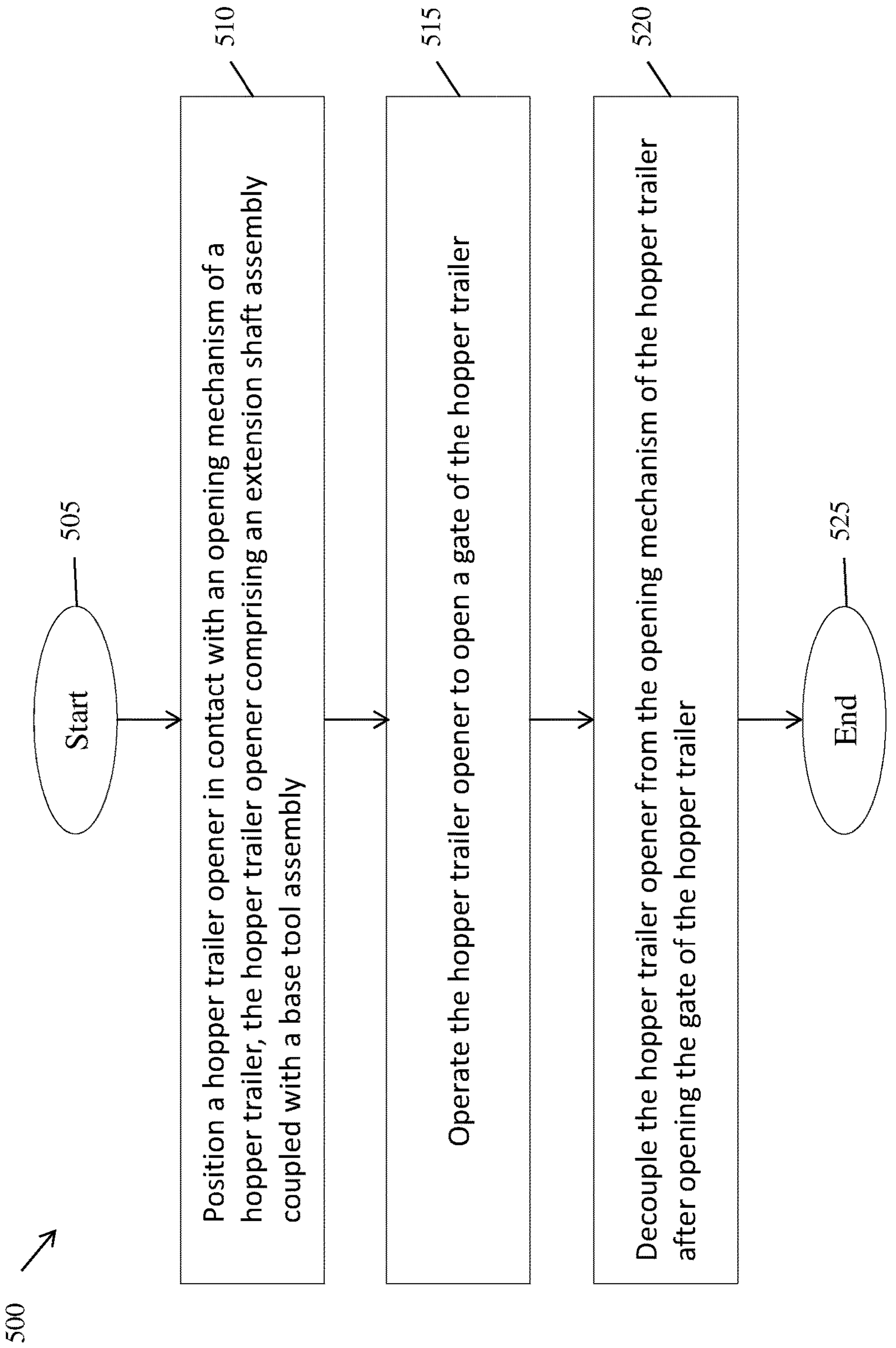
FIG. 5 illustrates an example simplified procedure for opening a hopper trailer according to embodiments of the present disclosure.

Once assembled, hopper trailer opener 100 may be operated, according to various embodiments of a method of the present disclosure and shown in FIG. 5, which is an example simplified procedure for opening a hopper trailer. Procedure 500 may begin at step 505 and continue on to step 510 where, the hand-held hopper trailer opener, described in greater detail above, is positioned in contact with an opening mechanism of a hopper trailer, and, in step 515, the hopper trailer opener is operated to open a gate of the hopper trailer. In particular, power (such as electric, pneumatic, battery, or hydraulic power) may be provided to base tool assembly 120. For example, as shown in the specific embodiments described above, the opener may be operated pneumatically by supplying pressurized air via an air hose coupled to an air inlet fitting at one end of the base tool assembly. An appropriate socket assembly may be chosen based, for example, on the type and size of the hopper trailer gate opening mechanism and attached, such as via a quick-connect, to the extension/drive shaft tubing. The hopper trailer opener may then be positioned in contact with and coupled to the trailer opening mechanism, and a supply of power may be initiated and, optionally, controlled using the throttle lever to operate the hopper trailer opener and open the gate of the hopper trailer. The handle and grip of the base tool assembly can be used to align and direct the hopper trailer opener prior to and during operation, and further, may enable the operator to reduce the force applied to the trailer opening mechanism. In this way, suitable torque may be applied to the opening mechanism at a controlled speed, controlled and stabilized by the operator, thereby significantly reducing potential damage to the opening mechanism and hopper trailer opener 100. In addition, the suitable torque and controlled speed of the opener will benefit the operator's safety by removing the strenuous and repetitious efforts required by traditional means of opening trailer hoppers. In step 520, the hopper trailer opener may then be decoupled from the opening mechanism after the gate has been opened. Recoupling and operation of the hopper trailer opener may also be used to close the hopper trailer gate. Procedure 500 then ends at step 530.

While there have been shown and described illustrative embodiments that provide for a hopper gate opener, it is to be understood that various other adaptations and modifications may be made within the spirit and scope of the embodiments herein, with the attainment of some or all of their advantages. For instance, while the techniques herein are described primarily with respect to an opener for trailer hoppers, the teachings herein are not limited as such and may be adapted for use with other forms of non-trailer hoppers, accordingly.

What is claimed is:

1. A hopper trailer opener comprising an extension shaft assembly removably coupled with a base tool assembly, wherein the base tool assembly comprises a motor contained within a motor housing;

a rotatable drive configured to be rotated by the motor, the rotatable drive having a drive head and a spindle attached to the rotatable drive and protruding from the drive head, and wherein the extension shaft assembly comprises:

a drive shaft having an end comprising a base tool assembly connector configured to be removably coupled to the rotatable drive of the base tool assembly and an opposing end having a trailer coupler configured to couple to an opening mechanism of a hopper trailer; and a locking mechanism configured to temporarily prevent the extension shaft assembly from rotating, wherein the locking mechanism comprises a brace fixedly attached to the base tool assembly and a lock fixedly attached to the extension shaft assembly, the lock movable to engage the brace.

2. The hopper trailer opener of claim 1, wherein the base tool assembly further comprises a trigger lever configured to adjust at least one of motor speed or motor direction.

3. The hopper trailer opener of claim 1, wherein the base tool assembly further comprises a torque reaction bracket fixedly attached to the base tool assembly.

4. The hopper trailer opener of claim 1, wherein the motor is a pneumatic motor, an electric motor, a battery-powered motor, or a hydraulic motor.

5. The hopper trailer opener of claim 1, wherein the base tool assembly further comprises an end having a fitting connectable to a source of power.

6. The hopper trailer opener of claim 5, wherein the source of power is a pressurized source of air supplied by attachment to the fitting.

7. The hopper trailer opener of claim 1, wherein the motor is configured to provide 40 to 250 ft-lbs of torque to the opening mechanism of the hopper trailer.

8. The hopper trailer opener of claim 1, wherein the motor has a maximum speed of 20 to 140 rpm.

9. The hopper trailer opener of claim 1, wherein the rotatable drive further comprises at least one attachment stabilizer centrally positioned at a base of the spindle.

10. The hopper trailer opener of claim 9, wherein the spindle has a base and the attachment stabilizer is centrally positioned at the base of the spindle.

11. The hopper trailer opener of claim 1, wherein the drive head is an angled drive head.

12. The hopper trailer opener of claim 11, wherein the angled drive head has an angle of about 90 degrees.

13. The hopper trailer opener of claim 1, wherein the spindle comprises a square drive and a threaded stud configured to mate with an end of the extension shaft assembly.

14. The hopper trailer opener of claim 1, wherein the base tool assembly connector comprises a drive hub sized and shaped to fit over the spindle.

15. The hopper trailer opener of claim 1, wherein the trailer coupler comprises a socket assembly sized and shaped for a rotatable coupler of the opening mechanism of the hopper trailer.

16. The hopper trailer opener of claim 15, wherein the socket assembly is separable from the drive shaft by a structure capable of being separated with two hands without any use of additional tools.

17. The hopper trailer opener of claim 15, wherein the socket assembly comprises one or more socket extenders.

18. A method of opening a hopper trailer comprising:

positioning a hand-held hopper trailer opener in contact with an opening mechanism of a hopper trailer, the hopper trailer opener comprising an extension shaft assembly coupled with a base tool assembly, wherein the base tool assembly comprises:

a motor contained within a motor housing, and a rotatable drive configured to be rotated by the motor, the rotatable drive having a drive head and a spindle attached to the rotatable drive and protruding from the drive head, and wherein the extension shaft assembly comprises a drive shaft having an end comprising a base tool assembly connector configured to be coupled to the rotatable drive of the base tool assembly and an opposing end having a trailer coupler configured to couple to the opening mechanism of the hopper trailer, and a locking mechanism configured to temporarily prevent the extension shaft assembly from rotating, wherein the locking mechanism comprises a brace fixedly attached to the base tool assembly and a lock fixedly attached to the extension shaft assembly, the lock movable to engage the brace;

operating the hopper trailer opener to open a gate of the hopper trailer; and decoupling the hopper trailer opener from the opening mechanism of the hopper trailer after opening the gate of the hopper trailer.

19. The method of claim 18, wherein the base tool assembly further comprises a trigger lever configured to adjust at least one of motor speed or motor direction.

20. The method of claim 18, wherein the base tool assembly further comprises a torque reaction bracket fixedly attached to the base tool assembly.

* * * * *